United States Patent [19]

Shimp

[11] 4,258,403
[45] Mar. 24, 1981

[54] GROUND FAULT CIRCUIT INTERRUPTER

[75] Inventor: Alan B. Shimp, Monroeville, Pa.

[73] Assignee: Westinghouse Electric Corp., Pittsburgh, Pa.

[21] Appl. No.: 44,150

[22] Filed: May 31, 1979

[51] Int. Cl.³ ............................................. H02H 3/08
[52] U.S. Cl. ...................................... 361/42; 361/44; 361/96
[58] Field of Search .................... 361/42, 44, 45, 46, 361/94, 95, 96, 97

[56] References Cited

U.S. PATENT DOCUMENTS

| | | |
|---|---|---|
| 3,818,275 | 6/1974 | Shimp . |
| 3,959,695 | 5/1976 | Shimp .................................. 361/42 |
| 4,121,269 | 10/1978 | Hobson, Jr. ........................... 361/44 |

Primary Examiner—Harry E. Moose, Jr.
Attorney, Agent, or Firm—M. J. Moran

[57] ABSTRACT

A ground fault detecting circuit interrupter is taught. A ground fault is sensed by utilizing a summing transformer interconnected with the three-phase current transformers for normal fault detection. The turns ratio between the primary winding and the secondary winding of the summing transformer is kept purposely high so that the excitation current for the current transformers is made relatively small when compared to the normal secondary current of the current transformers. This has the effect of improving the accuracy of the normal fault detecting portion of the circuit breaker. The relatively high turns ratio between the primary and second of the summing transformer usually supplies insufficient current to directly actuate the trip coil of the circuit interrupter on the occurrence of a ground fault. However, this latter current is utilized to charge a capacitive storage element after a ground fault has been sensed. When the capacitive storage element is fully charged, it is switched into a circuit disposition suitable for discharge through the trip coil of the circuit interrupter with sufficient current flow to open the separable main contacts of the circuit interrupter.

9 Claims, 1 Drawing Figure

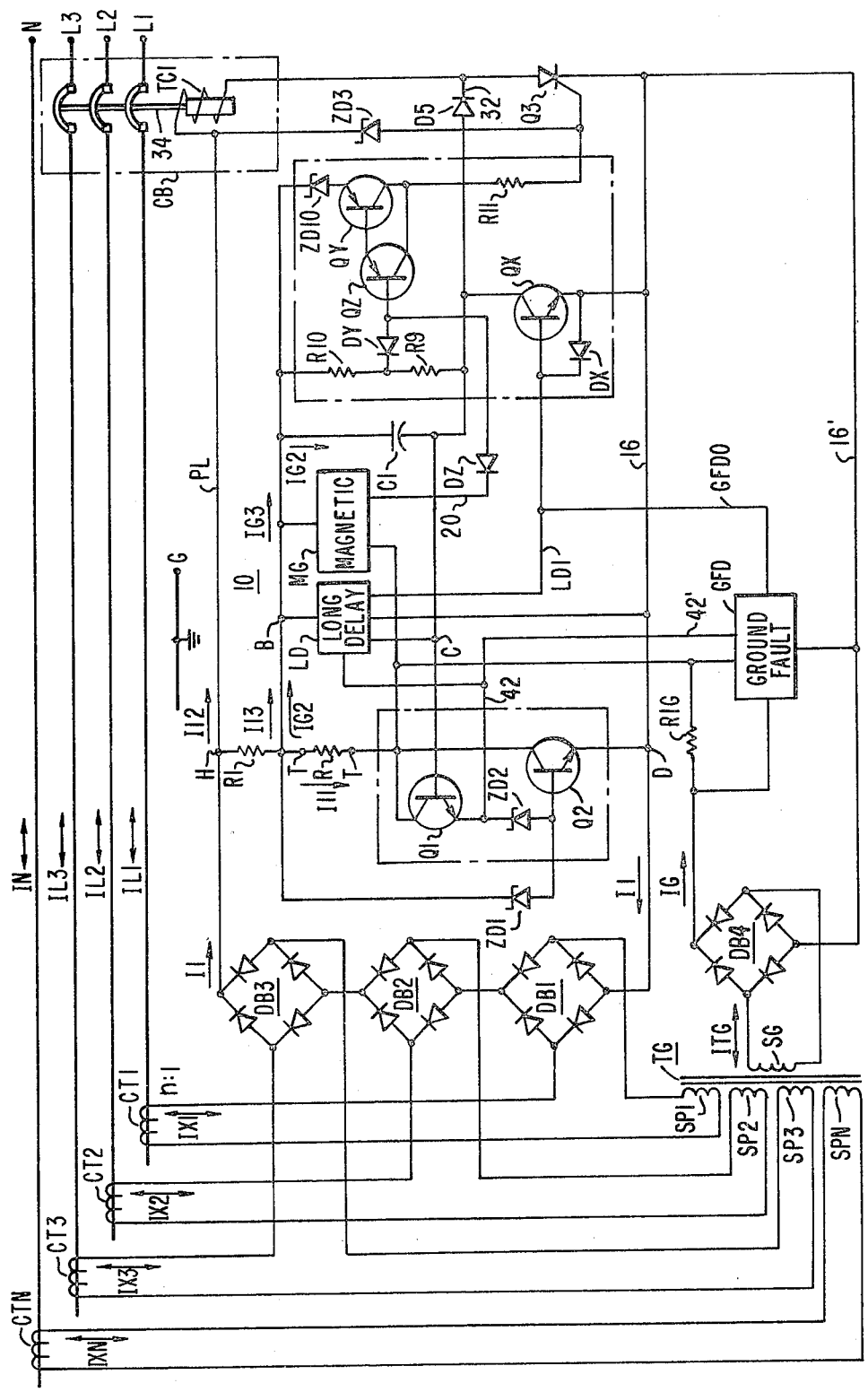

GROUND FAULT CIRCUIT INTERRUPTER

BACKGROUND OF THE INVENTION

The subject matter of this invention relates generally to circuit breakers with tripping circuits and it specifically relates to circuit breakers with ground fault trip control circuits.

U.S. Pat. No. 3,818,275, "Circuit Interrupter Including Improved Trip Circuit Using Current Transformers", issued June 18, 1974 to A. B. Shimp and assigned to the assignee of the present invention discloses a circuit interrupter for sensing fault current in a line to be protected for deriving intelligence about the status of the fault current and for causing the circuit interrupter to initiate a tripping action when the fault current reaches a predetermined level. After the tripping action has been initiated, sufficient energy for continuing the tripping operation to its completion is then derived from the fault current. Consequently the control system provides intelligence concerning the proper time to trip the circuit breaker prior to the actual tripping operation but does not provide significant tripping energy during this time span as it is obviously not needed. After the tripping operation has begun, however, the control system then provides significant tripping energy but little or no intelligence data, as intelligence data is no longer needed. Sometimes, though it is desirous to sense the presence of ground fault current in a line to be protected and to cause a tripping action or operation based on the presence of the ground fault current. Since ground fault current may not be of sufficient magnitude to supply tripping energy during that part of the tripping operation when it is needed, a separate energy deriving circuit using only ground fault current is provided for substantially completing the ground fault tripping operation once it has begun. The circuit of this type may be found in U.S. Pat. No. 3,959,695 entitled "Circuit Interrupter With Ground Fault Trip Control" issued May 25, 1976 to A. B. Shimp and also assigned to the assignee of the present invention. Sometimes it is desirous to use a summing transformer ground fault sensing system. In that case the three-phase lines, for an example, of a three-phase electrical system are each monitored by a separate current transformer. The output of the current transformer is provided in each case to the input of the normal fault current detecting circuit and in series circuit relationship to a primary winding of the summing transformer, the secondary winding of which is connected to the ground fault sensing circuit. It is well known that the sum of the currents flowing in a polyphase electrical system is generally equal to zero. If ground fault current flows, the latter sum will not equal zero. If the sum of the three-phase currents is not equal to zero, a voltage output will exist on the aforementioned summing transformer secondary winding. This is indicative of the presence of ground fault current. Unfortunately, in an arrangement of the type previously described, the serially connected primary of each primary winding of the summing transformer has a voltage imposed thereacross. This voltage also appears across the current transformer secondary and this requires an exciting current to flow. The exciting current subtracts vectorially from the secondary current that would otherwise normally flow. One way to improve the accuracy of the circuit is to reduce the exciting current relative to the secondary current of the current transformer. This can be done by keeping the voltage across the primary winding of the summing transformer as low as possible. However, it is necessary to provide a minimum amount of voltage at the secondary winding of the summing transformer to operate that portion of the control circuit which is associated with detecting ground faults. In order to keep the primary voltage relatively low while keeping the secondary voltage of the summing transformer sufficiently high to meet the latter mentioned criteria the turns ratio of the summing transformer (from primary winding to secondary winding) must be relatively high. However, if the turns ratio of the summing transformer is relatively high the secondary current thereof tends to be relatively low. It may be so low, that when a ground fault is sensed the magnitude of the secondary current of the summing transformer which is utilized to actuate the trip coil will be insufficient to accomplish the latter purpose. It would be desirous therefore if a ground fault circuit interrupter could be found in which the serially connected primary of the summing transformer for ground fault detection had a relatively low voltage impressed thereacross during normal operation, but which can nevertheless cooperate with the remaining portion of the ground fault detecting circuit for providing sufficient energy to trip the circuit breaker in a reasonable period of time after the ground fault has been detected.

SUMMARY OF THE INVENTION

In accordance with the invention, circuit breaker apparatus is taught in which switched capacitive storage apparatus is provided across the secondary winding of a ground fault detecting summing transformer. The summing transformer has a sufficiently high turns ratio to operate the ground fault detecting circuit which is also connected to the secondary thereof, while allowing the primary winding voltage thereof to be relatively low so that the excitation current for the monitoring current transformer is correspondingly low. For improved accuracy in that part of the circuit interrupter system which is allocated to detect the normal faults, a switched-capacitor storage device is connected across the secondary winding of the summing transformer. Normally only a low voltage appears across this capacitor. Only when a ground fault condition has been detected and a trip is initiated does the switched capacitor begin to accumulate an electrical charge of sufficient magnitude to eventually cause a voltage sensing switch to introduce a discharge path across the charged capacitor. When this happens, the capacitor discharges through the trip coil of the circuit interrupter, providing sufficient electrical current to actuate the trip coil to cause a system protective tripping operation.

BRIEF DESCRIPTION OF THE DRAWING

For a better understanding of the invention, reference may be had to the preferred embodiment exemplary of the invention shown in the accompanying drawing in which a three-phase electrical circuit interrupter system is shown with ground fault sensing and actuating portions.

DESCRIPTION OF THE PREFERRED EMBODIMENT

Referring now to the drawing, an electric circuit breaker system 10 is schematically shown. In particular, the electrical circuit breaker system 10 is utilized in this embodiment of the invention to protect a three-phase electrical system which may, for example, include phase lines or conductors L1, L2, and L3 as well as neutral conductor N. There is provided a circuit breaker CB which includes separable main contacts disposed to open and close on the lines L1, L2, and L3 for interrupting electrical current flowing therethrough. The separable main contacts are driven by an appropriate linkage 34 which is interconnected with a trip coil TC1 so the electrical actuation of the trip coil TC1 actuates the linkage 34 to open the separable main contacts thus interrupting current through the lines L1, L2, and L3. The current which flows through the lines L1, L2, and L3 and the neutral N are identified as IL1, IL2, IL3, and IN, respectively. Each of these currents may be separately monitored by appropriate current transformers CT1, CT2, CT3, and CTN, respectively. The current for the aforementioned current transformers may have turns ratios of n:1. Each of the current transformers CT1 through CTN may comprise a magnetic core not shown for which a magnetizing current IX1, IX2, IX3 and IXN, respectively, may exist. In general, each of the current transforms CT1 through CT3 is interconnected with the input terminals of full wave bridge rectifiers DB1, DB2, and DB3, respectively. Furthermore, in each case, serially interconnected with the input terminals to the aforementioned bridges DB1–DB3 are the primary windings SP1 through SP3 of a summing transformer TG. Current transformer CTN may be interconnected with the fourth primary winding SPN of the summing transformer TG. Each of the current transformers CT1 through CT3 therefore provide information to the appropriate bridge circuits DB1 through DB3 which is related to fault and overload current in the lines of the system to be protected. The current transformers CT1–CTN additionally provide information to the summing transformer TG which is related to the presence of ground fault current in the system to be protected. Generally ground fault current may be of a significantly lower magnitude than normal fault or overload current. The nature of a ground fault is such that the relatively low level of ground fault current should cause a circuit interrupter system to interrupt it even though the same level of normal fault current or overload current would not be a candidate for interruption.

The outputs of the three bridges DB1 through DB3 are interconnected in series circuit relationship with each other. The three serial outputs taken together are interconnected as a unit with the remaining portion of the control system of the circuit interrupter apparatus 10 at the terminals D and H which represent lines 16 and PL, respectively. Interconnected to the point H is one side of a resistive element R1, the other end of which is connected concurrently to an electrical point B, to one side of a second resistive element R and to the cathode or regulating terminal of the zener diode ZD1. The other side of the resistive element R is connected to a line 40. Point B is connected concurrently to one input terminal of a "long delay" circuit LD, to one input terminal of a "magnetic" trip circuit MG, to one side of a capacitive element C1 to one side of the resistive element R10 and to the regulating terminal of a zener diode ZD10. Line 40 is connected to another input terminal of the previously described "magnetic" trip circuit MG, to one input terminal of a "ground fault" detection circuit GFD and to the collector of a transistor element Q1. The emitter of the transistor element Q1 is connected concurrently to a line or conductor 42 and to the regulating terminal of a zener diode ZD2. The other terminal or the anode of the zener diode ZD2 is connected to the anode of the previously described zener diode ZD1 and to the base of the second transistor Q2, the collector of which is connected back to the collector of the transistor Q1. The emitter of the transistor Q2 is connected to the electrical line 16. The electrical line 42 is connected to one input of the previously described "long delay" circuit LD and to an output for the "ground fault" detection circuit GFD through the line 42'. The base of the transistor Q1 is connected to an output terminal of the "long delay" circuit LD at the point C. Point C is connected concurrently to the other side of the capacitive element C1, to one side of a resistive element R9, to one side of a diode D5 and to the collector of a transistor QX. The cathode of the diode D5 is connected through line 32 to the junction between the trip coil TC1 and the anode of a silicon control rectifier Q3. The cathode of the silicon control rectifier Q3 is interconnected with the line 16 and another line 16'. The gate of the silicon control rectifier Q3 is connected to an anode of a zener diode ZD3. The cathode of which is connected to the previously described line PL. The line PL is connected to the other side of the trip coil TC1. The gate of the silicon control rectifier Q3 is also connected to one side of a resistive element R11, the other side of which is connected concurrently to the collectors of two transistors QZ and QY. The emitter of transistor QY is connected to the anode of a zener diode ZD10 the other side of which is connected to the point B as previously described. The emitter of the transistor QZ is connected to the base of the transistor QY. The base of the transistor QZ is connected to the anode of a diode DZ and to the anode of a diode DY. The cathode of the diode DY is connected to the common junction between the previously described resistors R9 and R10. The cathode of the diode DZ is connected to an output terminal of the previously described "magnetic" circuit MG. The collector of the transistor QX is connected to point C, the anode of the diode D5 and one side of the resistive element R9. A diode DX is connected so that its anode is connected to the emitter of the transistor QX and its cathode is connected to the base of the transistor QX. The base of the transistor QX is also connected to an output terminal GFD0 of the ground fault detector GFD and to an output of the "long delay" circuit LD at the line LD1. The "long delay" circuit LD is also interconnected with the line 16. One of the inputs of the "magnetic" circuit MG is connected with the line 40. The secondary winding SG of the summing transformer TG is interconnected to the input terminals of the fourth diode bridge DB4. One of the output terminals of the diode bridge DB4 is connected to the line 16' which is also interconnected with the "ground fault" detector GFD. The other output terminal of the diode bridge DB4 is connected as an input to the ground fault detector GFD and to the other side of the previously mentioned resistive element R1G. The resistive elements R and R1G are calibration resistors for the normal current detection circuit and the ground fault detection circuit, respectively, of the system 10.

NON-GROUND FAULT OPERATION

The actioneering arrangement of the diode bridges DB1 through DB3 is such that a current I1 flows in the control circuit 10. Circuit I1 is proportional to the highest of the currents IL1 through IL3 in the lines L1 through L3 respectively. Normally, the silicon controlled rectifier Q3 is maintained in a non-conductive state so that a major portion of the current I1 flows through the resistive element R1. Most of this latter mentioned current flows through the resistive element R and from there through the two normally conducting transistors Q1, Q2 to the point D where the current I1 is returned to the diode bridges DB1 through DB3. In this embodiment of the invention, the sensing portion of the circuit 10 is calibrated with the resistive element R. Resistive element R may be of the type which can be removed and reinserted into the circuit at the terminals T. The resistive value R is chosen so that the circuit 10 may have universal application over a wide range of system load current. Basically, the resistive element R is chosen in each case so that normal of rated current IL1 through IL3, that is 100% of rated current, causes a secondary current of 50 milliamps rms, 70 milliamps peak, to flow in the secondaries of the current transformers CT1 through CT3, for example. This current is conducted by way of the auctioneering bridges DB1 through DB3 through the resistive element R. The resistive element R is usually chosen as a precision resistor so that the component of current I11 of current I1 when multiplied by the value of the resistive element R generates a voltage which is impressed across various sensing elements in the control circuit 10. This voltage is utilized to initiate various tripping operations. For example, the "magnetic" or generally instantaneous tripping circuit MG receives a voltage signal from across the terminals B and 40. If the peak value of this latter voltage exceeds a predetermined level, the "magnetic" trip circuit MG will provide an output signal at terminal 20 which will cause the Darlington pair configuration of transistors QY and QZ to conduct thus actuating the gate of the thyristor Q3. This in turn provides a current path through the trip coil TC1 for actuation thereof. On the other hand, the capacitive element C1 cooperates with the resistive element R and a portion of the transistor Q1 to store the peak value of voltage impressed across the resistive element R by the current component I11. This latter value is impressed upon the "long delay" circuit by way of the terminals or points B and C. A reference voltage is supplied to the "long delay" circuit LD by way of the terminals connected to line 42 and the line 16. The "long delay" circuit LD will begin to time out depending upon the value by which the voltage impressed across the terminals B and C exceeds the latter reference voltage. The more the voltage between the terminals B and C exceeds the reference voltage, the faster the time out. Eventually, a point in time is reached when an output voltage level is impressed between the line LD1 in and terminal D. This level actuates the transistor QX to an on state providing a relatively low impedance current path for charging the capacitive element C1. Current component I13 of current I1 is utilized to charge the capacitive element C1. At the same time, the voltage between terminals C and D is reduced to the collector to emitter voltage of the conducting transistor QX. Thus the transistors Q1 and Q2 cease to conduct. This means that current component I13 is essentially equal to current I1. The current I1 is again returned to the auctioneering diode bridges DB1 through DB3 by way of the line 16. As time passes and capacitor C1 is charged the voltage across resistor divider R9 plus R10 increases. When the voltage across R9 exceeds the voltage between line D and the base of the transistor QZ, the diode DY will conduct. Diode DY cooperates with the Darlington pair comprising the thyristors QY and QZ in a manner similar to that described with respect to the cooperation of the diode DX with the "magnetic" trip circuit. The effect is to provide a pulse of sufficient magnitude to the gate of the thyristor Q3 to cause that thyristor to turn on to thus make the trip coil TC1 available for current conduction and thus actuation of the circuit breaker CB. Furthermore, when this happens, the capacitive element C1 will discharge through the resistive element R1, the line PL, the trip coil TC1, the anode cathode circuit of the thyristor Q3 diode DX and finally the base collector junction of QX. The amount of current provided is sufficient to actuate the trip coil TC1. Furthermore, a component of current I12 is available until interrupted for supplementing the latter mentioned discharge current of the capacitive current C1. This latter component of current also represents a portion of the current I1. Even if the capacitive element C1 were not fully charged, the nature of the inner relationship of the currents IL1 through IL3 and the current I1 is such that current IL2 will be of sufficient magnitude to energize the trip coil TC1 without a contribution from the discharge current of the capacitive element C1.

GROUND FAULT OPERATION

In the ground fault sensing circuit the summing transformer TG has four primary windings SP1 through SP3 and SPN which provide an output voltage at the secondary winding SG only if the currents IL1 through IL3 and IN are not vectorially equal to zero. If such is the case, it can be inferred that a ground fault exists somewhere in one of the lines to be protected. A ground fault current of sufficient predetermined magnitude will provide a voltage across the secondary winding SG of sufficient magnitude to produce a secondary winding current ITG. This current will then produce a ground fault indicating current IG which flows through resistive element R1G, line 40 and the combination of the normally conducting transistors Q1 and Q2 acting in conjunction with the zener diode ZD2 where the current IG is returned to the diode bridge DB4 by way of the line 16'. If there is no ground fault, then current IG will be essentially zero and the voltage across the resistive element R1G will be essentially zero. However, if there is a ground fault in one of the lines IL1 through IL3 or the neutral, the turns ratio of the summing-transformer TG will be such as to introduce a voltage across the secondary winding SG. This will produce a ground fault indicating current IG which will produce a voltage drop across the resistive element R1G of sufficient magnitude when compared to the reference voltage of the ground fault sensing circuit GFD to produce a signal on the line GFD0. The signal on the line GFD0 will be of sufficient magnitude to cause the transistor QX to conduct. The reference voltage for the ground fault detector GFD is supplied between the lines 42' and 16'. When the transistor QX begins to conduct, it operates in a manner described previously with respect to the normal fault detection apparatus. A current component IG2 of current IG flows through the resistive element R and through the capacitive C1 for charging the capacitive element C1. The current is then return through the conducting transistor QX by way of lines 16 and 16' to the diode bridge DB4. When the charge on the capacitive elements C1 reaches a predetermined magnitude which is indicative of the availability of the charged capacitive element C1 to actuate the trip coil TC1, the thyristor element Q3 is turned on by way of the previously described voltage divider circuit R9 and R10 and the Darlington pair QZ and QY. When this happens trip current of sufficient magnitude flows through the resistive element R1, the line PL, the trip coil TC1, the conducting thyristor Q3 and back to the capacitive element C1. Furthermore, the component I12 of current I1 may be available for supplementing the discharging capacitor current. The total current flowing through the trip coil TC1 is sufficient to energize the trip coil TC1 to move the plunger in the mechanism 34 in such a manner that the separable main contacts open thus interrupting the ground fault current in the lines to be protected. As was the case previously, conduction of the transistor element QX leads to the turning off of the transistor elements Q1 and Q2. Consequently, the capacitive discharge current plus any current component I12, plus any further component of ground fault current IG3 is available for actuating the trip coil TC1. This is possible because the accuracy required for a sensing operation is no longer needed as the appropriate sensing operation has already occurred. Most of the available energy in the circuit 10 is now devoted to continuing the circuit breaker opening operation which was previously initiated by the detection of the ground fault. Of course once the circuit breaker CB has opened, no currents IL1 through IL3 will flow and thus the energy for both normal overload detection and ground fault detection will drop to zero. It is to be noted that in order to maintain the voltage across any of the primary windings SP1 through SP3 at a relatively low value so that a component of excitation current IX1 through IX3 is reduced to a relatively low value for purposes previously described, the turns ratio of the transformer TG must be sufficiently high to induce a secondary voltage across the secondary winding SG of sufficient magnitude to maintain the ground fault detection circuit GFD in a state for ground fault sensing. However, the relatively high turns ratio generally operates to keep the current ITG at a relatively low value. Consequently, if the current ITG were relied upon exclusively to energize the trip coil TC1 (through component IG3) it would be unlikely that a current of sufficient magnitude would be provided to trip coil TC1 to actuate it. This is the reason the capacitive element C1 is initially charged and then subsequently discharged. The capacitive element C1 is essentially charged at a predetermined rate and then discharged at an another rate for supplying sufficient current to the trip coil TC1 to actuate it. This is possible because the ground fault detection circuit is such that energization of the trip coil can be delayed by a relatively small amount from the initial detection of the ground fault. This relatively small amount of delay is utilized to charge the capacitive element C1. On the other hand in a non-ground fault operation, in some instances, it may be desireous to trip the circuit breaker CB by actuating the trip coil TC1 generally instantaneously. In a circuit such as that the zener diodes ZD3 is chosen so as to have a breakdown voltage which will generally allow instantaneous actuation of the gate of the thyristor Q3 if the voltage between the terminals H and D reach a value indicative of the need for an instantaneous opening of the circuit breaker CB. This of course would override the effects of the "magnetic" circuit MG; the "long delay" circuit LD and the "ground fault" circuit GFD. Of course, the ground fault circuit operates independently of the "long delay", LD "magnetic" MG and an instantaneous trip circuits of the normal fault sensing portion on the circuit 10. Consequently even though the value of current flowing in any of the lines L1, L2, L3 or LN is insufficient to cause a tripping for overload reasons there may flow an amount of ground fault current which will cause tripping.

It is to be understood with respect to the embodiment of this invention that it is not limited to three phase operation, it may be useful on single phase operation or polyphase operation. Although the ground fault detecting and actuating portion of the circuit is shown as utilizing a summing transformer TG, that is not limiting. It is also to be understood that the various polarities are not limiting and may be changed provided the voltage polarities are correspondingly changed and the circuit flow paths are correspondingly changed.

The apparatus taught with respect to the embodiments of this invention have many advantages. One advantage lies in the fact that excitation current in current transformers may be reduced for improving the overall accuracy of a circuit by utilization of a summing transformer for the ground fault portion of the circuit, which has a relatively high turns ratio. The relatively high turns, ratio which would be normally detrimental to the supply of current for tripping the trip coil TC1, may be offset by utilizing a capacitive element for charge storage. The stored charge may then be provided to the trip coil at a sufficient rate for actuation thereof. An other advantage lies in the fact that the charge storage device previously described may be additionally used for the purpose of peak voltage storage for another operation in the circuit breaker control circuit. This therefore gives the element in question a dual function which leads to reduced cost among other things.

I claim:

1. A circuit interrupter of the type having separable main contacts which open and close on a conductor in an electrical system, comprising:

current transformer means for providing a secondary winding current thereof which controls the operation of said separable mean contacts as a function of the primary winding current thereof which flows in said conductor;

summing transformer means the primary winding of which is connected in circuit relationship with the secondary winding of said current transformer means for utilizing said secondary winding current for determining the presence of ground fault current in said electrical system, the voltage drop across said primary winding of said summing transformer means contributing to the presence of excitation current in said secondary winding of said current transformer means, the presence of said excitation current adversely affecting the accuracy of said secondary winding current for in representing said primary winding current; and control means connected to the secondary winding of said summing transformer means for providing an output signal whenever said ground fault current exceeds a predetermined level, said control means requiring a minimum value of secondary winding voltage for accurate operation thereof, the turns ratio of said summing transformer means being sufficiently high to provide said minimum value of secondary winding voltage from a value of primary winding voltage of said summing transformer means which is sufficiently low as to produce a value of excitation current which is insignificant when compared with said current transformer means secondary winding current to thus reduce the inaccuracy caused by said excitation current.

2. The combination as claimed in claim 1 wherein said primary winding of said summing transformer means is connected in series circuit relationship with said secondary winding of said current transformer means.

3. A circuit interrupter of the type having trippable separable main contact means which open and close on a conductor in an electrical system, comprising:

current transformer means for providing a secondary winding current thereof which controls the operation of said separable main contact means as a function of the primary winding current which flows in said conductor;

summing transformer means the primary winding of which is connected in circuit relationship with the secondary winding of said current transformer means for utilizing said secondary winding current for determining the presence of ground fault current in said electrical system, the voltage drop across said primary winding of said summing transformer means contributing to the presence of excitation current in said secondary winding of said current transformer means, the presence of said excitation current adversely affecting the accuracy of said secondary winding current for representing said primary winding current;

control means connected to the secondary winding of said summing transformer means for providing an output signal whenever said ground fault current exceeds a predetermined level, said control means requiring a minimum value of secondary winding voltage for accurate ground fault sensing, the turns ratio of said summing transformer means being sufficiently high to provide said minimum value of secondary winding voltage from a value of primary winding voltage of said summing transformer means which is sufficiently low as to produce a value of excitation current which is insignificant when compared with said current transformer secondary winding current to thus reduce the inaccuracy caused by said excitation current;

switched charge storage means connected in circuit relationship with said secondary winding of said summing transformer means for being charged thereby and connected in circuit relationship with the output of said control means for being switched to a charging state when said ground fault current is sensed, said turns ratio being sufficient to allow said charged storage means to be satisfactorily charged in a given increment of time, said turns ratio being insufficient to actuate said separable main contacts; and means for discharging said charge storage means into said trippable separable main contact means for actuation thereof after said charge storage means has been sufficiently charged.

4. The combination as claimed in claim 3 wherein said primary winding of said summing transformer means is connected in series circuit relationship with said secondary winding of said current transformer means.

5. The combination as claimed in claim 3 wherein said secondary winding of said summing transformer means is used primarily to sense the presence of said ground fault prior to the switching of said switched charge storage means to a charging state and is used primarily to supply electrical charge to said switched charge storage means thereafter.

6. The combination as claimed in claim 3 wherein said charge storage means comprises capacitor means.

7. The combination as claimed in claim 4 wherein said secondary winding of said summing transformer means is used primarily to sense the presene of said ground fault prior to the switching of said switched charge storage means to a charging state and is used primarily to supply electrical charge to said switched charge storage means thereafter.

8. The combination as claimed in claim 7 wherein said charge storage means comprises capacitor means.

9. A circuit interrupter of the type having separable main contacts which open and close on electrical conductors through which system electrical current may flow, comprising:

(a) Current transformer means disposed to monitor said system electrical current ($I_p$) for providing an output current ($I_s$) which is related to said system electrical current ($I_p$) by the vector addition: $I_p = I_sN + I_{exc}$, where $I_{exc}$ is excitation current for said current transformer means;

(b) Current actuated trip coil means which is actuated by a minimum level of trip current ($I_t$) flowing for a minimum increment of time ($\Delta t$) thus sustaining the opening operation of said separable main contacts after initiation thereof;

(c) Control means electronically connected with said current transformer means and said trip coil means for providing said trip current ($I_t$) for said increment of time ($\Delta t$) to open said separable main contacts whenever said output current ($I_s$) exceeds a predetermined value;

(d) Ground fault sensing transformer means having a primary winding of N1 turns and a secondary winding of N2 turns, said primary winding being interconnected with said current transformer means so that said output current ($I_s$) flows therethrough;

(e) Ground fault control means interconnected with the secondary winding of said ground fault sensing transformer means;

(f) Switched capacitive means interconnected with said ground fault control means and said secondary winding of said ground fault sensing transformer for being charged when switched on as a function of the turns ratio N2/N1 and the value of said output current ($I_s$), said capacitive means being switched on when the secondary current ($I_1$) in said secondary winding of said ground fault sensing transformer exceeds a predetermined value, said secondary current ($I1$) being less than said minimum level of trip current ($I_t$) but said turns ratio being larger than the minimum value necessary to maintain the excitation current for said current transformer means significantly less than the quantity $NI_s$; and (g) Switchable path means which is interconnected with said capacitive means for supplying said minimum value of trip current ($I_t$) for said minimum increment of time ($\Delta t$) for opening said main contacts when said capacitive means has been charged to a predetermined voltage.

* * * * *